United States Patent
Duquette

[15] 3,650,764
[45] Mar. 21, 1972

[54] ENZYMATIC BAKING COMPOSITIONS AND METHODS FOR USING SAME

[72] Inventor: Noel Charles Duquette, Flanders, N.J.

[73] Assignee: H. C. Brill Company, Inc., Fairfield, N.J.

[22] Filed: Mar. 30, 1970

[21] Appl. No.: 23,989

Related U.S. Application Data

[63] Continuation-in-part of Ser. No. 732,064, May 27, 1968, abandoned.

[52] U.S. Cl. ................................................99/90 R, 99/91
[51] Int. Cl. .........................................A21d 8/04, A21d 2/04
[58] Field of Search ..................................................99/90, 91

[56] References Cited

UNITED STATES PATENTS

1,179,877  4/1916  Wahl et al. .................................99/90
1,803,588  5/1931  Blank et al. .................................99/91

Primary Examiner—Raymond N. Jones
Assistant Examiner—James R. Hoffman
Attorney—Brooks, Haidt & Haffner

[57] ABSTRACT

Novel dough-treating compositions containing a proteolytic enzyme such as papain, bromelain or ficin in combination with dough aging agents such as alkali metal and alkaline earth metal iodates, bromates or peroxides and sufficient edible, non-toxic acid so that the pH of a 10 percent aqueous solution is from about 3.7 to 6.5, and the use of such compositions to reduce the fermentation time of yeast-leavened dough.

14 Claims, No Drawings

ENZYMATIC BAKING COMPOSITIONS AND METHODS FOR USING SAME

This application is a continuation-in-part of copending application Ser. No. 732,064, filed on May 27, 1968, now abandoned.

BACKGROUND OF THE INVENTION

This invention relates in general to formulations and methods useful in the production of baked products and more particularly to formulations and methods for reducing the overall duration of dough processing prior to baking. More specifically, it relates to novel enzymatic compositions, methods of producing said compositions, and methods for using such compositions to decrease the fermentation time of yeast-leavened dough.

The dough baking process to an increasingly greater extent in recent years has tended to the large batch, continuous type of production. Modern day production methods, however, have not been utilized to the degree potentially achievable, due partly to the fact that the baking process has not changed substantially over the years. For example, in the preparation of baked goods from yeast-leavened dough, the baker, whether a large bulk processor, a small local bakery, or an individual preparing his own needs, is met with the prospect of expending inordinate amounts of time while his dough ferments or "rises."

While specific baking processes vary depending on individual preferences, virtually all processes utilizing yeast-leavened dough require at some stage that the dough be allowed to ferment. Typically, a smooth dough is prepared by blending an appropriate flour and yeast with water or other suitable liquids such as milk, buttermilk, condensed milk or the like, or mixtures thereof. Other ingredients can be included as desired. This dough is then set aside and allowed to ferment, usually at a temperature of 75°–86° F. After the dough has fermented, the baker then normally mixes the dough with additional ingredients, the nature of which is generally dictated by the type of final baked product desired; ages the mix for a period of time, usually 3 to 5 hours; cuts and molds the dough; proofs the dough for one hour; and bakes the proofed dough.

During the fermentation time above mentioned, the yeast, generally *Saccharomyces cerevisiae*, *Candida utilis* or the like, converts some starch in the flour to sugar and digests the sugar to form carbon dioxide gas, the release of which gas expands the dough and causes the characteristic sponginess of the subsequent baked product. The time required for fermentation usually runs from 3 to 5 hours with minor variations on either side of this range depending on the texture and other properties desired in the final product. This fermentation time (or "sponge time," as it is also commonly known) is notoriously time-consuming and is regarded in the art as being the major factor in preventing full utilization of modern continuous production techniques.

It is appreciated in the art that the large amount of time spent in achieving the desired fermentation level is quite expensive since large equipment is required, turnover time is long, large amounts of space are required, and labor and overhead costs per unit of product are high. The art has attempted to reduce fermentation time, but such procedures as have been employed are unsuitable from one standpoint or another. For example, prior attempts have revolved around the use of one or more additives to the dough and to some extent have been successful in decreasing the fermentation time. Widespread acceptance has not been achieved, however, because quality of the baked product has suffered in one respect or another. For example, poor internal structure, poor taste, offcolor crust, and weak sidewalls are typical problems encountered in these prior techniques to such an extent as usually to result in aesthetically unacceptable baked material. It would thus be highly desirable to provide a means by which the fermentation time of yeast-leavened dough could be decreased withour sacrificing the desirable qualities of the baked product.

The use of an enzyme with an acid to improve crumb elasticity in bread products has been suggested, but such use does not reduce the fermentation time required to produce baked goods. It has also been suggested to prepare soda crackers by adding to the dough mix phosphoric acid or an acid phosphate, an ammonium salt to nourish the yeast, a dough-maturing agent, an enzymatic material, and a material which decreases dough acidity during baking. Such a product is unsatisfactory for facilitating the production of conventional bread products because an acceptable bread flavor is not obtained and the product is gray and heavy.

THE INVENTION

In accordance with the present invention, novel dough-treating enzyme-containing compositions have been discovered, which when used in the preparation of leavened dough, result in dramatically reduced fermentation times compared to the times normally required and yet doughs prepared with such compositions yield baked goods of commercially acceptable quality. The enzyme-containing compositions are utilized by conducting the fermentation step in the presence of the compositions, preferably intimately dispersed throughout a dough matrix. This is conveniently achieved as will be seen hereinafter by blending the composition with the flour to be used either before or after, desirably after, the flour has been mixed with water and/or other liquid ingredients.

The compositions of the present invention are enzymatic compositions containing a proteolytic enzyme, a dough aging, or maturing, agent of the oxidizing type, and at least one edible nontoxic carboxylic acid. In addition, highly beneficial results are obtained when there is included a carrier and other adjuvant material, as further described hereinafter. The composition basically comprises an enzyme, an aging agent, and the carboxylic acid. In such a composition, the aging agent is conveniently used at levels ranging from one to 100 times the weight of the enzyme. The formulation can be intimately dispersed in an edible filler, described hereinafter. Additionally, other ingredients can be present as will be appreciated from the present disclosure.

All parts percentages, proportions, and ratios herein are by weight unless otherwise specified.

Fermentation time is significantly shortened by the combined effect of the enzyme, aging agent, and carboxylic acid on the yeast present in the dough. Various of the other ingredients are used in order to supply desirable characteristics to the baked products and, as will be seen below, the present invention provides a preferred manner of preparing the entire composition so that maximum benefits are derived therefrom. The present invention contemplates breadlike baked goods or products having properties typified by bread. Thus, the term bread or breadlike is herein used to refer to conventional white bread, whole and cracked wheat bread, rye bread, French bread, rolls including dinner rolls, Parkerhouse rolls, twist rolls, and the like, sweet dough products such as cinnamon rolls, yeast-leavened coffee cakes and the like, bread sticks, and such yeast-leavened products which do not utilize any appreciable so-called chemical leavening. The compositions of this invention are free of bicarbonate or other alkali materials.

The enzyme or enzymes used according to the present invention are essentially proteolytic in character. That is, they are capable of breaking down proteins into smaller units such as peptides and amino acids. They manifest their proteolytic activity at least in the range of from 65° F. to 160° F., and most particularly between 70° F. and 125° F., and at pH's of from 4 to 9, and particularly between 4 and 6. Such enzymes should have little or no diastatic, i.e., amylolytic, activity within these ranges. Amylolytic activity in the enzyme produces a dough which is undesirably "young" and which produces a tough, reddish crust on the finished baked goods. The proteolytic enzymes, or proteinases, particularly suitable for use in the present invention are those derived from plant sources and are exemplified by bromelain, papain, and ficin. Bromelain (also known as bromelin) is derived from the pineapple plant, and papain and ficin are, respectively, derived from the latex of the papaya tree and fig tree. Each has been reported extensively in the literature and is available commercially.

The dough aging agents referred to above have been discovered to enhance the effect of the enzyme on the yeast. The desirable agents are those generally regarded as oxidizing materials and are thought to have an effect on the gluten in the flour. Typical among these are alkali metal and alkaline earth metal bromates and iodates such as potassium bromate, potassium iodate, calcium bromate and calcium iodate, and the like, and mixtures thereof. Alkaline earth metal or organic peroxiodes such as calcium peroxide or acetonyl peroxide and the like can also be used. The preferred compositions of the invention include at least one such agent, preferably an alkali metal bromate, such as potassium bromate. In certain embodiments, the iodate is also present with the bromate at levels ranging from one-fourth to one-half the amount of the latter.

The edible acids used herein are aliphatic carboxylic acids, suitably unsaturated polycarboxylic acids, desirably di- or tricarboxylic acids such as fumaric acid, maleic acid, and the like or hydroxy-substituted aliphatic carboxylic acids such as lactic acid, citric acid, and the like. Fumaric acid or mixtures of fumaric acid and lactic acid are preferred. The use of such acids provides a suitable pH medium for achieving effective activity of the enzyme and aging agent during subsequent fermentation of the yeast-flour mixture. Surprisingly, a flavor development effect is achieved with both fumaric acid and lactic acids, and these acids also provide a surprisingly beneficial medium for enzyme activity. With regard to the latter, the acids also have the advantage of providing a stabilizing effect on the activity of the enzyme. Moreover, it is often desirable to include acetic acid, along with the polycarboxylic or hydroxy carboxylic acid or acids to aid in developing a fuller flavor enhancement of the finished bread. The acetic acid adds quite a desirable character to the resulting baked product and appears to supplement the effect of the other acid.

Lactic acid has been used in baked goods in the past, usually in substantially greater quantities than used herein, for accelerating the action of the yeast. Unfortunately, the presence of the lactic acid in prior use has required the use of at least four to five times the amount of yeast normally employed to achieve a fermentation time of about half that of normal. By and large, such a system has been used only in emergency situations where a baker has a short supply of goods and needs baked products for sale in relatively short time. Such a technique is substantially different from the system of the present invention wherein the enzyme is the major factor in reducing the fermentation time. In the present invention utilizing the selected acids no additional yeast, or at most only slightly higher amounts of yeast, are employed than is normally employed currently.

Ordinarily, yeast is used in amounts ranging from about 2 to 8 percent of the dough mixture. When the present invention is utilized in baking processes with 3% or lower quantities of yeast, about ½ to 1 percent of additional yeast should be added. Amounts of yeast from 4 to 8 percent in the dough are employed as usual.

Rapid increase in fermentation time is achieved from the use of such compositions, and the physical characteristics of the final baked product are commercially acceptable. Preferably, however, additional ingredients are incorporated to enhance the quality of the final baked product with particular reference to color, grain texture and size, loaf sidewalls, shred, and the like.

Accordingly, the compositions of the invention preferably include varying amounts of additional or adjuvant ingredients such as ammonium and calcium salts, e.g., ammonium chloride, ammonium sulfate, calcium sulfate, fatty acid esters, and glucono-delta-lactone. The salts have been discovered to exert a beneficial effect on the complex reactions taking place during fermentation with particular respect to action on the flour and protein degradation products. For example, ammonium chloride appears to exert a beneficial influence on the elasticity of gluten in wheat flour, and ammonium sulfate aids in yeast activity. The calcium salts are useful for their effect on flour, especially where white products are being prepared.

The fatty acid esters serve at least two purposes herein. Firstly, they aid in producing sturdy sidewalls in the finished product, and secondly, they can be employed to reduce the oxidizing activity of the maturing agents on the enzyme, especially when the agent or agents have been blended with the enzyme in a liquid medium, as described hereinafter. Suitable fatty acid esters are mono- and/or diglycerides of fatty acids having from 12 to 22 carbon atoms and partial esters of the same acids with glycols, such as glyceryl monostearate and propylene glycol monostearate.

It has been found that the presence of glucono-delta-lactone in amounts up to 1.5 percent can serve quite beneficially to impart a character to the dough which manifests itself during the baking process. For example, a good degree of symmetrical development and minimal wildness of shred is obtained when the material is present as indicated.

In certain preferred embodiments of the present invention, the compositions contain autolyzed yeast. As used herein, autolyzed yeast means a yeast which has been deactivated. That is, it has been dehydrated or otherwise treated so that it does not have the amylolytic character of conventional yeast, but it does have certain proteolytic character and does break gluten protein. A typical autolyzed yeast suitable in the practice of the present invention is sold under the name "Yeastamine" by A. E. Staley Mfg. Co., Chicago, Illinois.

Preferred compositions according to this invention contain from 50 to 150 percent of autolyzed yeast, based on the amount of proteolytic enzyme present. It has been found that in such cases the quantity of other proteolytic enzyme can be reduced. The autolyzed yeast has somewhat lesser proteolytic activity than, say, bromelain, but when used in addition to, or preferably in lieu of some of the bromelain, it provides the advantages of the invention without complete breakdown of the gluten.

There are preferred modes of preparing the compositions because the oxidizing agents have a potentially degrading effect on the enzymes and on the edible acid or acids. The presence of such aging agent together with the enzyme may ultimately result in the deactivation of the enzyme according to complex reaction phenomena. When the materials are substantially dry, the reaction proceeds sufficiently slowly so as to be negligible, and a composition containing only the enzyme, the aging agent and the acid can be stored and shipped without substantial loss of enzymatic activity and can effectively be used by the baker. A solid edible carrier can be used further to slow the undesired reaction and increase shelf life before use. The use of such a carrier, filler, or diluent has the added advantage that a greater bulk of material is supplied and the composition is easier to meter. It will be appreciated from the present description that relatively small amounts of enzyme are effective in promoting the rapid increase of fermentation time, and the blending of such small amounts into large batches of dough can, in some instances, be facilitated by use of a carrier.

It is accordingly generally desirable to have some carrier present in the compositions of this invention. It is preferred that there be at least as much carrier present in the composition as there is proteolytic enzyme, although it will be appreciated that the carrier has no effect on the shortening of fermentation time per se. Usually, the carrier is present in at least 10 times the amount of enzyme.

The quantity of carrier utilized will depend, in part, on the baker's requirements for diminishing the fermentation time and the particular mixing and other equipment to be used in practicing the processes herein described for preparing bread doughs. It is preferred that the compositions of the present invention comprise at least about 3 percent of a carrier, and the carrier can constitute up to about 95 percent of the compositions. Generally, the greatest quantity of carrier desirably used is about 60 percent.

The carrier materials contemplated herein are nontoxic, edible, pulverulent solids. Suitable materials useful as carriers herein include salt, dextrose, various types of flour such as soya flour, wheat flour, other grain flours, and the like. When an autolyzed yeast is used, the presence of a carrier, particularly one such as soya flour, materially aids in preventing caking of the composition.

In preparing the compositions of the present invention, a liquid medium can in some instances aid in the blending process. It is desirable that only so much liquid, when employed, be used as will facilitate the preparation of a good homogeneous blend. This is due partially at least, to the fact that the rate of reaction between the bromates or iodates and the proteolytic enzyme is accelerated greatly in a liquid medium as opposed to the rate of these ingredients when present in a substantially dry state. Thus, when a liquid is used for blending purposes, it is preferred that the aging agent and enzyme be as nearly insoluble therein as possible. Additionally, large amounts of liquid should be avoided. Suitable results are obtained with glyceride oils, particularly vegetable oils such as corn oil, cottonseed oil, soybean oil, coconut oil and the like. A liquid blending system apart from any liquid edible acid can be dispensed with entirely, if desired, and only solid blending media used. It has been found that the rate of reaction between proteolytic enzyme and the iodates or bromates is relatively low when the entire composition contains less than about 10 percent liquid. However, it is generally preferred to minimize or obviate the use of liquid media.

In producing the compositions of the present invention wherein a liquid medium is used to aid in blending, it is preferred to blend all ingredients and one of either the enzyme or the aging agent and reserving the other for inclusion after all the materials have been blended. Thus, for example, a suitable method is to blend all solid ingredients and fillers except the aging agent with the liquid media to be employed thereby to achieve a smooth blend. The aging agent can then be added to yield the final composition. Using such a procedure, reaction between ingredients is virtually eliminated.

Alternatively, a blend of all solid ingredients except the filler and fatty acid ester can be prepared using enough of the glyceride oil to obtain a smooth consistency followed by inclusion of the fatty acid ester. In some embodiments, any reaction occuring between the enzyme and the iodate, bromate, or peroxide can be considerably retarded by the addition of the fatty acid ester. The acid, if a liquid such as lactic acid and acetic acid, can then be mixed followed by the inclusion of carrier. In such a procedure, it is difficult to avoid all reaction between the oxidizing agent and the enzyme; but in general, such reaction as takes place will not be intolerable. It is, of course, preferred to minimize this reaction; and in this regard, it has been found that reasonable gauge in so determining is to allow no more than about a 10 percent increase in volume of the composition. As stated, the reaction is effectively terminated by the addition of the carrier and/or the fatty acid ester. The preferred mode of adding the enzyme or aging agent after all other ingredients have been blended ensures that essentially all added enzyme will be available in subsequent use of the composition.

There results from the blending of the ingredients a smooth free-flowing composition having a generally fine, granular, dry appearance and preferably containing less than about 10 percent weight of liquid.

In certain embodiments of the present invention, it is desirable to package pre-measured quantities of the dough-treating composition in soluble packets which can be added to the dough. This obviates any need for the baker to measure or meter the composition, or even to handle it. Such packets should be composed of edible, nontoxic, water-soluble materials, such as starch, casein, and the like. A preferred material for the packets is cornstarch sheet film material. The low-carrier compositions of this invention, such as those hereinafter shown inter alia in Examples XI and XII, are particularly suited to such use.

As noted above, the basic active ingredients are the proteolytic enzyme, the aging agent, and the carboxylic acid ingredient as required to provide the required acidic milieu. Generally, the proteolytic enzyme will comprise from about 0.01 to 0.40 percent of the total composition, and it preferably comprises 0.05 to 0.25 percent of the composition. The amount of aging agent is broadly present in amounts from one to 100 times, as noted above, and is more preferably present in amounts of from about 1.5 to 20 times the amount of proteolytic enzyme, the higher ranges being used when an antolyzed yeast is used in combination with the major proteolytic enzyme ingredient. Thus, the compositions of this invention would generally contain from about 0.2 to about 5 percent of aging agent.

The carboxylic acid is sufficient so that the pH of a ten percent aqueous solution of the composition is from 3.7 to 6.5, desirably from 4.0 to 5.0 and preferably about 4.5. The carboxylic acids according to the present invention rapidly provide the desired pH, while at the same time contributing no bitter or other untoward aftertaste to the finished bread product. To achieve these goals, the quantity of acid should comprise from about 1 to about 15 percent of the total composition, and preferably the carboxylic acid comprises from about 3 to about 12 percent of the composition.

The remainder of the dough-treating composition comprises the edible carrier and adjuvant materials herein described. When less concentrated compositions are desired, the quantity of carrier increases on a relative basis, and the relative quantity of adjuvant material (and of the basic ingredients) decreases. Thus, those skilled in the art will understand from the present description that adjuvant materials typically include from 0 to 15 percent, preferably from 0.4 to 12.5 percent, of ammonium chloride; from 0 to 15 percent, preferably from 0.04 to 12.5 percent, of ammonium sulfate; from 0 to 15 percent, preferably from 1.3 to 12.5 percent, of calcium sulfate; from 0 to 50 percent, preferably from 5 to 48 percent, of mono- and/or dihydrogen phosphates; from 0 to 62% fatty acid esters; and from 0 to 2 percent of glyceride oil.

As stated, the compositions of the invention are used to accelerate the fermentation time in a yeast-leavened dough. Ordinarily, fermentation times from 15 to 60 minutes are routinely obtained and the final baked product is commercially acceptable. Any yeast-leavened dough as is normally used in the art can be used herein with all varieties of flours being amenable to the process. Thus, wheat, barley, corn, rye, and the like, can be used. Similarly, conventional yeasts as are used in the baking art may be employed such as *Saccharomyces cerevisiae*, *Candida utilis*, and the like.

The benefits of the invention are generally obtained when the composition of the invention is included in dough in amounts sufficient to provide an enzyme level ranging from 0.05 to 1 gram and preferably 0.1 to 0.75 g. per 100 pounds of flour.

Using such compositions, the blending and mixing thereof with the flour mix is preferably carried out at a temperature of from 75° to 88° F. and most preferably from 82° to 85° F. Proofing or "rising" is generally carried out at from 105° to 125° F. and preferably from 112° to 120° F., at high humidity, usually of the order of 95 percent or higher.

The following examples are given to illustrate embodiments of the invention as it is presently preferred to practice it. It will be understood that the examples are illustrative, and the invention is not to be considered as restricted thereto except as indicated in the appended claims. In all Examples, lactic acid, where used, is 88 percent pure.

EXAMPLE I

The following ingredients are selected:

| Ingredient | Weight (lbs) | Percent |
| --- | --- | --- |
| 1. Bromelain | 1.75 | 0.087 |
| 2. Potassium Bromate | 8 | 0.399 |
| 3. Potassium Iodate | 2 | 0.0996 |
| 4. Ammonium Sulfate | 2 | 0.0996 |
| 5. Ammonium Chloride | 17.25 | 0.859 |
| 6. Calcium Sulfate | 31 | 1.54 |
| 7. Monocalcium Phosphate | 94 | 4.67 |
| 8. Glyceryl Monostearate | 125 | 6.21 |
| 9. Acetic acid (99% purity) | 60 | 2.99 |
| 10. Lactic acid | 125 | 6.21 |
| 11. Salt | 500 | 24.9 |
| 12. Dextrose | 375 | 18.6 |
| 13. Soya Flour | 660 | 32.8 |
| 14. Silicone Emulsifier | 10 | 0.497 |
| | 2001 1.00 | 99.9612 | a. Ingredients 1 through 8 are combined and blended in a standard ribbon blender mixer.

b. Thereafter the acetic acid and lactic acid are mixed with each other and blended with the combined ingredients 1 through 8 for about 2 minutes. A reaction is observed to commence, and the mix begins to turn yellow.

c. The salt and dextrose are added immediately and the mix blended for one minute; there is no evidence of reaction after these materials are added.

d. Then the soya flour and silicone are blended and mixed for about 5 minutes.

The resulting enzymatic blend is a fine granular dry material. Fourteen grams of this material are then added into a white bread dough mix of the following components thus providing an enzyme level of about 0.39 g. per 100 lbs. of flour.

| Ingredient | Weight (ounces) |
| --- | --- |
| White flour (wheat) | 50 |
| Water | 33 |
| Yeast | 1.5 |
| Sugar | 3 |
| Salt | 1 |
| Milk | 1 |
| Liquid vegetable shortening | 2 |
| | 91.5 oz. |

The mixture is blended in a laboratory mixer at 83° to 85° F. for 1 minute at 50 r.p.m. and 11 minutes at 112 r.p.m. The blended dough is allowed to rest for 40 minutes (floor time), is then scaled into bread pieces and the pieces allowed to rest for 10 minutes. Loaves are then formed and allowed to "rise" in a steam box having approximately 95 percent humidity and at a temperature of 112° to 120° F. The rise time (also called proof time) is about 65 minutes. The raised loaves are then baked at 400° F. for 25 minutes or until done. There results a sturdy white bread product having excellent external strength and internal grain characteristics, and good taste, flavor and odor. It will be appreciated by those skilled in the art that the fermentation time of 40 minutes is a substantial improvement over the fermentation times of 4 to 5 hours normally encountered in the art.

In an alternative procedure, the above description is followed for the preparation of the enzymatic blend except that the potassium bromate and iodate are added after the salt and dextrose. An excellent bread product is subsequently obtained.

EXAMPLE II

The following ingredients are selected:

| Ingredient | Weight (lbs) | Percent |
| --- | --- | --- |
| 1. Bromelain | 0.50 | 0.106 |
| 2. Potassium Bromate | 2.00 | 0.424 |
| 3. Potassium Iodate | 0.50 | 0.106 |
| 4. Ammonium Chloride | 4.00 | 0.848 |
| 5. Ammonium Sulfate | 0.30 | 0.0635 |
| 6. Calcium Sulfate | 7.20 | 1.53 |
| 7. Glyceryl Monostearate | 28.4 | 6.0 |
| 8. Monocalcium phosphate | 28.4 | 6.0 |
| 9. Vegetable oil (soya) | 2.50 | 0.53 |
| 10. Salt | 113.60 | 24.2 |
| 11. Dextrose | 85.2 | 18.1 |
| 12. Lactic acid | 38.4 | 8.15 |
| 13. Acetic acid | 14.2 | 3.0 |
| 14. Soya flour | 142. | 30. |
| | 467.20 | 99.76 |

Items 1 through 8 are mixed and blended to a smooth consistency and the remaining ingredients blended as described in Example I except that the mixing after b) is continued until the blended mixture has increased in volume by about 10 percent. The addition of the salt and dextrose and the blending thereof is effective to halt the volume increase.

After the soya flour addition, the resulting mixture is dry and granular and contains no lumps. A total of 14.2 g. of the mixture is next formulated into a flour mixture as described in Example I and the mixture processed as described therein gives a dough having an enzymatic inclusion of 0.25 g. enzyme per 100 lbs. of flour. The rise time is again about 65 minutes and the resulting bread is comparable to the bread obtained in Example I, that is a commercially acceptable, tasty, sturdy, baked product of excellent color and grain characteristics.

EXAMPLE III

| Ingredient | Weight (g.) | Percent |
| --- | --- | --- |
| 1. Bromelain | 0.5 | 0.073 |
| 2. Potassium Bromate | 1.8 | 0.262 |
| 3. Potassium Iodate | 0.4 | 0.058 |
| 4. Ammonium Chloride | 1.2 | 0.175 |
| 5. Ammonium Sulfate | 0.3 | 0.044 |
| 6. Monocalcium Phosphate | 28.4 | 4.14 |
| 7. Yeast Food | 28.4 | 4.14 |
| 8. Glyceryl Monostearate | 42.6 | 6.2 |
| 9. Vegetable Oil | 14.2 | 2.07 |
| 10. Acetic Acid | 14.2 | 2.07 |
| 11. Lactic Acid | 21.3 | 3.10 |
| 12. Dextrose | 113.6 | 16.6 |
| 13. Salt | 113.6 | 16.6 |
| 14. Mulsoy (soya flour) | 113.6 | 16.6 |
| 15. High Gluten Wheat Flour | 191.7 | 28.0 |

Following the procedure of Example II, items 1 through 8 are blended with 9 in step (a); 10 and 11 in step (b); 12 and 13 in step (c); and 14 and 15 in step d). Yeast food is a mixture of 25% calcium sulfate, 0.3% potassium bromate, 39.7% sodium chloride, 10% ammonium chloride, 25% starch.

Five bread formulations are prepared and baked using the indicated amount of the above composition and following the procedure of Example I.

| Ingredient | (1) White Bread | (2) Sour French | (3) Sweet French | (4) Rye | (5) Onion Rye |
| --- | --- | --- | --- | --- | --- |
| Flour (white), oz | 50 | None | None | None | None |
| High gluten flour, oz | None | 50 | 50 | 40 | 40 |
| Rye flour, oz | None | None | None | 10 | 10 |
| Water, oz | 32 | 31 | 30 | 28 | 28 |
| Yeast, oz | 1½ | 1½ | 1.5 | 1.5 | 1.5 |
| Sugar, oz | 3 | None | None | None | None |
| Shortening (solid), oz | 2 | 1 | 1 | 1 | 1 |
| French sour, oz | None | 5 | None | None | None |
| Rye sour, oz | None | None | None | 5 | 4 |
| Salt, oz | 4 | None | 1 | None | None |
| Dry skimmilk, oz | 1 | None | None | None | None |
| High acid buttermilk, oz | None | None | 1 | None | None |
| Enzyme composition, g.: | | | | | |
| Level 1 | 17.5 | 21 | 21 | 21 | 21 |
| Level 2 | 2.15 | None | None | None | None |
| Chopped onion, oz | None | None | None | None | 2 |
| Rise time, min.: | | | | | |
| Level 1 | 72 | 50 | 55 | 45 | 50 |
| Level 2 | 67 | | | | |

The rye formulations 4 and 5 are mixed somewhat shorter than the eleven minutes recited in Example I, generally for 8 to 10 minutes. Floor times for formulations 2 through 5 range from 30 to 35 minutes.

Each of the above bread products after baking, are excellent breads having good flavor and taste, and possess excellent internal and external properties. The white breads show good color characteristics.

The French Sour used above is a formulation prepared from:

| | |
|---|---|
| Potato Flour | 2 oz. |
| Water | 2 oz. |
| Bread Flour | 2 oz. |
| High Acid Buttermilk | 1 oz. | mixed and allowed to rest overnight.

Rye Sour used above is a formulation prepared from:

| | |
|---|---|
| Rye Flour | 2 oz. |
| Water | 1 oz. |
| High Acid Buttermilk | 1 oz. |
| Yeast | 0.5 g. | mixed and allowed to rest overnight.

EXAMPLE IV i. The following ingredients are selected and blended as described in Example II to give formulation A.

| Ingredient | Amount g | Percent |
|---|---|---|
| Papain (Papin) | 0.5 g. | 0.074 |
| Ascorbic Acid | 0.5 | 0.074 |
| Potassium bromate | 2 | 0.294 |
| Ammonium Chloride | 1 | 0.147 |
| Glucono Delta Lactone | 2 | 0.294 |
| Monocalcium phosphate | 28.4 | 4.16 |
| Glyceryl monostearate | 28.4 | 4.16 |
| Citric Acid | 14.2 | 2.08 |
| Yeast Food | 28.4 | 4.16 |
| Salt | 113.6 | 20.0 |
| Dextrose | 113.6 | 20.0 |
| Lactic acid | 21.3 | 3.12 |
| Acetic acid | 7.1 | 1.04 |
| Soya oil | 28.4 | 4.16 |
| Mulsoya flour | 113.6 | 20.0 |
| Bread flour | 177.5 | 26.0 |

The above composition in the amount of 19.25 g. is blended with the following ingredients:

| | |
|---|---|
| Flour-wheat | 50 oz. |
| Water | 32 oz. |
| Sugar | 3 oz. |
| Shortening (liquid vegetable) | 2 oz. |
| Yeast | 1 oz. |
| Salt | 1 oz. |
| Whey or dry milk (Krafin, Kraft Co.) | 1 oz. | and mixed as described in Example I except that the floor time is 20 minutes and bake time 30 minutes at 400° F. The rise time is 80 minutes and the resulting bread shows good volume and freshness characteristics, has good crust color, grain, texture, flavor and taste. Some holes are observed and there is some break in shred.

The above enzymatic formulations containing varying amounts of papain all produce good baked products when the procedure is repeated keeping all other ingredients the same. Such results are summarized below.

| | B | C | D | E |
|---|---|---|---|---|
| Papain | 0.75 g | 1.0 g | 1.25 g | 1.5 g |
| Other ingredients | Same as Formulation A | | | |
| Rise time (proof time) | 80 min. | 78 min. | 80 min. | 92 min. |

Baked bread products from the above using the bread formulation described above are comparable to those obtained with Formulation A. Formulation C produces what is regarded as the best product based on better grain characteristics.

ii. When ascorbic acid is omitted from the above enzymatic formulations and the procedure repeated, a comparably good bread product is obtained although some wildness in shred is observed. Higher dough mixing temperatures of the order of 86° to 87° F. produce somewhat faster proof times, e.g., 70 to 75 minutes.

iii. An enzymatic composition the same as Formulation A) is prepared except that ascorbic acid is used at 1 g. instead of 0.5 g., the bread flour at 170.4 g. instead of 177.5 g., and the glucono-delta-lactone is used at levels of 0, 1, 3, and 4 g. instead of 2 g. Results are summarized below:

| Glucono-delta-lactone (g) | 0 | 1 | 3 | 4 |
|---|---|---|---|---|
| Dough Mix. Temp. (°F.) | 86 | 85 | 86 | 85 |
| Proof Time (min.) | 74 | 70 | 68 | 70 |

Products baked from such compositions using the bread formulation shown above are comparable in terms of color, taste, internal and external structure and represent highly acceptable products. Processing is somewhat enhanced at the higher levels of glucono-delta-lactone inclusion, however, giving a mechanical advantage in production.

iv. Varying the amount of ammonium chloride in Formulation A above at levels of 0, ½, 1 ½, and 2 g. results in quite acceptable bread products with best grain structure being obtained at the 0 level. Flavor, taste, and physical characteristics are good at all levels with best taste at about 1 g. inclusion.

v. When acetic acid is omitted from the above enzymatic formulations, bread products have quite acceptable taste, color and grain characteristics. Proof times are still low, e.g., around 62 to 65 minutes.

EXAMPLE V

Enzymatic compositions containing the following ingredients are prepared and 19.25 g. utilized in the white bread formulation (1) described in Example III in the manner described therein.

| | Control (g) | A (g) | B (g) | C (g) |
|---|---|---|---|---|
| Papain | 1 | | | |
| Bromelain | | 0.35 | 0.35 | 0.35 |
| Ascorbic acid | 1 | * | * | * |
| Potassium Bromate | 1.75 | * | * | * |
| Ammonium chloride | 1 | * | * | * |
| Glucono-delta lactone | 3 | * | * | * |
| Mon. Cal. Phosphate | 28.4 | * | * | * |
| Glyceryl Mono Stearate | 28.4 | * | * | * |
| Citric Acid | 14.2 | * | * | * |
| Yeast Food | 28.4 | * | * | * |
| Acetic Acid (Variable) | 14.2 | * | * | * |
| Lactic Acid | 21.3 | none | 42.6 | 63.9 |
| Oil | 28.4 | * | * | * |
| Salt | 113.6 | * | * | * |
| Dextrose | 113.6 | * | * | * |
| Mulsoya Flour | 116.6 | tis* | * | * |
| Bread Flour | 170.4 | * | * | * |

*same amount as control.

Dough mixing is effected at 85° F. for the control, A and B and at 84° F. for C. Total rest time before proofing is 50 minutes. Steam box proof of 60 minutes for the control and (b); and 65 minutes and 68 minutes for (a) and (c) is observed at higher levels of lactic acid. Crust color is somewhat darker than that obtained at lower levels but taste and texture are acceptable in all cases. Crust thickness also tends to increase at higher lactic acid concentration. Nevertheless, acceptable products are obtained.

EXAMPLE VI

The following formulations are prepared as described in Example III and 19.25 g. thereof used in the white bread formulation (1) as described therein.

| Ingredient | Control (g) | A (g) | B(g) | C(g) |
| --- | --- | --- | --- | --- |
| Potassium Iodate | 0.25 | none | 0.50 | 0.75 |
| Bromelain | 0.40 | * | * | * |
| Potassium Bromate | 1.50 | 1.75 | 1.25 | 1.00 |
| Ammonium Chloride | 1.00 | * | * | * |
| Glucono-delta-lactone | 4.00 | * | * | * |
| Mono Calcium Phosphate | 28.4 | * | * | * |
| Glyceryl Monoestearate | 42.6 | * | * | * |
| Yeast Food | 28.4 | * | * | * |
| Lactic Acid | 21.3 | * | * | * |
| Acetic Acid | 14.2 | * | * | * |
| Vegetable Oil | 28.4 | * | * | * |
| Salt | 113.6 | * | * | * |
| Dextrose | 113.6 | * | * | * |
| Mulsoya Flour | 113.6 | * | * | * |
| Bread Flour | 170.4 | * | * | * |

*same amount as control

Dough mixing is effected at 84° F. for the control, A, and C and 85° F. for B. Total rest time is 30 minutes. Proof time required is only 65 minutes for the control and 60 minutes for A, B and C.

In each case an excellent baked product is obtained having good taste, color, and physical properties. At higher levels of iodate and lower levels of bromate the dough is "wetter" and takes somewhat more time for good mixing.

EXAMPLE VII

Varying the amount of citric acid in the above formulations from 0 to 1 ½ oz. per 24 oz. of enzymatic formulation yields comparable results in proof times and in the subsequent bread products. Drier doughs are obtained at the high citric acid levels giving some processing advantage. Excellent products are obtained without citric acid, however.

EXAMPLE VIII

The formulation of Example IV (iii) (A) is used to prepare a control and four other test compositions, except that acetic acid is used at 14.2 g. instead of 7.1 g., and a variable enzyme inclusion is provided as shown below.

|  | Control | A | B | C | D |
| --- | --- | --- | --- | --- | --- |
| Papain (g.) | 1 | 0 | 0 | 0 | 0 |
| Bromelain (g.) | 0 | 0.25 | 0.5 | 0.75 | 1.0 |
| Dough Mix. Temp. (°F.) | 83.5 | 84 | 86 | 85 | 84.5 |
| Proof Time (min.) | 64 | 67 | 66 | 64 | 62 |

Each of the above formulations in the amount of 19.25 g. is used in the white bread formulation (1) of Example III in 5 separate tests at the indicated dough mixing temperature. Total rest time is 30 minutes. It is remarked that the quite short proof times in a 118° F., 95 percent humidity steam box give much improved times over what is normally obtained in the art. Bake time is 28 minutes at 410° F. There results from this very good bread products having excellent taste, aroma and texture. Volume control of the product is somewhat better for the control and D; C appears to give best dough handling.

EXAMPLE IX

The following ingredients are selected:

| Ingredients | Amount (g) |
| --- | --- |
| Potassium Bromate | 1.80 |
| Lactic Acid | 42.60 |
| Bromelain | .25 |
| Salt | 113.40 |
| Dextrose | 113.40 |
| Soya Flour | 224.30 |

The salt, dextrose, and potassium bromate are blended, and the lactic acid added thereto with blending to wet granulation. Thereafter the soya flour and bromelain are added and the mixture is blended. A total of 14.2 g. of the resulting blend are added to a dough having the following constitution:

| Patent Flour | 50 oz. |
| --- | --- |
| Water | 33 oz. |
| Sugar | 3 oz. |
| Salt | 1 oz. |
| Vegetable Shortening | 2 oz. |
| Yeast | 1.5 oz. |
| Dry Skim Milk | 1 oz. |

The mixture is blended at about 84° F. for 2 minutes at about 50 r.p.m. and then for 8 minutes at about 110 r.p.m. The dough is then treated as described in Example I. The proof time is 62 minutes. Bake time is 28 minutes at 410° F. A white bread product results which has very good volume, excellent crust color, very good oven spring and grain and good flavor and taste representing a quite acceptable commercial product. The proof time of 62 minutes is a substantial improvement in the fermentation time which otherwise normally ranges from 4 to 5 hours.

EXAMPLE X

This example illustrates the results obtained when the enzyme is blended at the end of the blending operation. The following ingredients are selected:

| Ingredients | A(g) | B(g) |
| --- | --- | --- |
| Potassium Bromate | 1.70 | 3.0 |
| Potassium Iodate | 0.40 | 0.7 |
| Ammonium Chloride | 3.50 | 7.0 |
| Ammonium Sulphate | 0.40 | 0.7 |
| Calcium Sulphate | 7.10 | 12.5 |
| Monocalcium Phosphate | 28.35 | 44.0 |
| Glyceride Monostearate | 28.35 | 49.7 |
| Salt | 85.10 | 226.8 |
| Dextrose | 28.35 | 56.8 |
| Lactic Acid | 28.35 | 56.8 |
| Dry Acetic Acid 2180 A* | 28.35 | 99.2 |
| Soya Flour | 226.80 | 310.0 |
| Bromelain | .25 | 0.4 |

* 20% acetic acid absorbed on gum arabic

The ingredients are blended as described in Example I except that the bromelain is blended in Step (d) rather than in (a). A total of 14.2 g. of the resulting granular blend A is mixed with the white bread formulation as described in Example I using dry skim milk instead of milk. Dough mix temperature is 85° F., floor time is 40 minutes, rest time is 10 minutes, proof time is 60 minutes, bake time is 28 minutes at 410° F. The resulting bread is comparable to that obtained in Example IX.

Similarly, inclusion of enzymatic composition A in a rye bread dough formulation similar to formulation 4 of Example III yields a rye bread having excellent taste, very good flavor and good volume, crust color and oven break, all obtained at a proof time of 49 minutes.

The use of Formulation B also gives good results in white bread and French Sour bread formulations.

EXAMPLE XI

The following ingredients are admixed in a standard ribbon blender:

| Ingredient | Amount (parts) |
| --- | --- |
| Fumaric acid | 53.08 |
| Calcium sulfate | 53.08 |
| Dicalcium phosphate | 212.32 |
| Ammonium chloride | 53.08 |
| Ammonium sulfate | 53.08 |
| Soya flour | 13.27 |

Then 0.93 parts of soya flour, 0.82 parts of bromelain, and 1.99 parts of Yeastamine autolyzed yeast are admixed and blended with the foregoing ingredients. Finally, 6.90 parts of potassium bromate and 5.31 parts of potassium iodate are admixed and blended with the aforementioned ingredients.

The foregoing composition is used at one-quarter the level of the composition shown in Example I. Thus, amounts of about 4 oz. of the composition of the present Example are used in conjunction with 100 lbs. of flour, or the composition is used at levels of about ¼ percent of the flour.

EXAMPLE XII

The following mixture is prepared:

Mixture A

| Ingredient | Amount (parts) |
|---|---|
| Fumaric acid | 53.41 |
| Calcium sulfate | 53.41 |
| Dicalcium phosphate | 240.35 |
| Ammonium chloride | 40.06 |
| Ammonium sulfate | 40.06 |

Mixture B is prepared by blending 0.53 parts of lactic acid and 4.77 parts of dextrose. Mixture C is prepared by combining 8.22 parts of soya flour, 0.67 parts of bromelain, and 1.34 parts of autolyzed yeast. Mixture D is prepared as a blend of 6.70 parts of potassium bromate and 4.11 parts of potassium iodate.

Mixture B is then blended into Mixture A, and then Mixtures C and D are added successively to provide a dough-treating composition according to this invention. It is used as described in Example XI.

EXAMPLE XIII

Eight hundred parts of salt, 200 parts of fumaric acid, 200 parts of calcium sulfate, 800 parts of dicalcium phosphate, 150 parts of ammonium chloride, and 150 parts of ammonium sulfate are blended together for 5 minutes. To this blend is added a mixture of 2 parts of lactic acid and 18 parts of dextrose. Then 700 parts of soya flour are thoroughly admixed with the foregoing ingredients. Finally, 3 parts of bromelain, 6 parts of autolyzed yeast, and 11 parts of soya flour are added, followed by 24 parts of potassium bromate and 16 parts of potassium iodate.

The foregoing thoroughly blended mixture can be used as a dough-treating composition according to the present invention. It is used in quantities on the order of 8 oz. to each 100 lbs. of flour, that is, at about the ½ percent level, based upon the quantity of flour used in the dough.

What is claimed is:

1. A dough-treating composition consisting essentially of, by weight,
   a. from about 0.01 to about 0.40 percent of an enzyme having proteolytic activity at temperatures up to at least about 170° F. within a pH range of at least 4 to 9 and being substantially free of diastatic activity within such pH range,
   b. from 0.2 to 5 percent of an iodate, bromate, or peroxide dough aging agent or mixture thereof,
   c. from one to 15 percent of an edible non-toxic carboxylic acid such that the pH of a ten percent aqueous solution of the total composition is from about 3.7 to 6.5, said acid being fumaric acid, maleic acid, lactic acid, citric acid, or a mixture thereof, or a mixture of one or more such acids with acetic acid.
   d. from zero to about 150 percent, based on the weight of the proteolytic enzyme, of autolyzed yeast,
   e. from zero to 15 percent of ammonium chloride,
   f. from zero to 15 percent of ammonium sulfate,
   g. from zero to 15 percent of calcium sulfate,
   h. from zero to 50 percent of mono- and/or dihydrogen phosphates,
   i. from zero to 62 percent of fatty acid esters,
   j. from zero to two percent of glyceride oil, and
   k. from zero to 1.5 percent of glucono-delta-lactone, the remainder of said composition being a solid edible carrier present in an amount of from three to 95 percent of the total composition.

2. The composition of claim 1 wherein autolyzed yeast is present.

3. The composition of claim 1 wherein the enzyme is bromelain, papain or ficin.

4. The composition of claim 1 wherein the acid is lactic acid.

5. The composition of claim 1 wherein the acid is fumaric acid.

6. The composition of claim 1 wherein the dough aging agent is potassium bromate, potassium iodate, calcium iodate, calcium peroxide, acetonyl peroxide, or mixtures thereof.

7. The composition of claim 1 containing from 50 to 150 percent of autolyzed yeast, based on the amount of the enzyme.

8. The composition of claim 1 wherein the carrier is soya flour.

9. The composition of claim 1 wherein the dough aging agent is a mixture of potassium bromate and potassium iodate.

10. The composition of claim 1 wherein the enzyme is bromelain.

11. The composition of claim 10 wherein there is at least one adjuvant selected from the group consisting of ammonium sulfate, ammonium chloride, calcium sulfate, and monocalcium phosphate.

12. The composition of claim 1 wherein the enzyme is papain.

13. In a process for producing baked products from a yeast-leavened flour mix wherein flour and yeast are blended with water or other liquids to prepare a dough, the dough is set aside and allowed to ferment, the fermented dough is mixed with additional ingredients, the mixed dough is aged, molded, and proofed, and the proofed dough is baked, the improvement which comprises effecting a rapid fermentation in the presence of an effective amount of a composition according to claim 1 to reduce the fermentation time to 15 to 60 minutes.

14. A process for the preparation of a dough-treating composition according to claim 1 which comprises adding the enzyme to a blend of ingredients c) through k) and the carrier; thoroughly mixing the enzyme with the blend; adding the dough-aging agent to the enzyme-containing blend; and thoroughly mixing the agent and enzyme-containing blend.

* * * * *